(12) United States Patent
Deuer

(10) Patent No.: US 7,600,610 B2
(45) Date of Patent: Oct. 13, 2009

(54) CLIMB ASSIST SYSTEM

(76) Inventor: Joseph F. Deuer, 560 W. David Rd., Kettering, OH (US) 45429

( * ) Notice: Subject to any disclaimer, the term of this patent is extended or adjusted under 35 U.S.C. 154(b) by 814 days.

(21) Appl. No.: 11/216,779

(22) Filed: Aug. 31, 2005

(65) Prior Publication Data
US 2007/0045045 A1     Mar. 1, 2007

(51) Int. Cl.
E06C 7/18     (2006.01)
(52) U.S. Cl. .......................................... 182/8
(58) Field of Classification Search ............ 182/8
See application file for complete search history.

(56) References Cited

U.S. PATENT DOCUMENTS

| | | | |
|---|---|---|---|
| RE30,072 E * | 8/1979 | Kleine et al. ............ | 182/8 |
| 4,458,781 A | 7/1984 | Ellis et al. | |
| 4,538,703 A | 9/1985 | Ellis et al. | |
| 4,550,804 A * | 11/1985 | Bummer .................. | 182/233 |
| 4,718,564 A * | 1/1988 | Bailey ..................... | 212/179 |
| 4,997,064 A | 3/1991 | Motte et al. | |
| 5,690,043 A * | 11/1997 | Muscara ............ | 114/230.23 |
| 5,855,251 A | 1/1999 | Deuer | |
| 7,198,134 B2 * | 4/2007 | LeMieux .................. | 182/8 |
| 2003/0173041 A1 * | 9/2003 | Simon et al. ........... | 160/267.1 |

FOREIGN PATENT DOCUMENTS

| | | |
|---|---|---|
| EP | 1319796 A1 | 6/2003 |
| WO | WO 03/071083 A1 | 8/2003 |
| WO | WO 2004/071930 A2 | 8/2004 |

\* cited by examiner

*Primary Examiner*—Alvin C Chin-Shue
(74) *Attorney, Agent, or Firm*—Stevens & Showalter LLP (57) ABSTRACT

A climb assist system for use in combination with a climbing structure having upper and lower ends. The climb assist system includes a header assembly for attachment to the upper end of the climbing structure. The header assembly includes a pulley frame having opposing front and rear ends and front and rear pulleys located adjacent the front and rear ends. Elongated guide members extend from the header assembly downwardly toward the lower end of the climbing structure. A climb assist cable extends over the front and rear pulleys and includes a front cable portion extending along a front side of the climbing structure for attachment to a worker, and a rear cable portion extending along a rear portion of the climbing structure adjacent to the guide members and attached to a counterweight for offsetting the worker's weight. The counterweight includes guide portions engaged with the guide members to guide the counterweight in a path closely adjacent to the ladder.

16 Claims, 5 Drawing Sheets

CLIMB ASSIST SYSTEM

BACKGROUND OF THE INVENTION

1. Field of the Invention

The present invention generally relates to a climb assist system and, more particularly, relates to a climb assist system adapted for installation in locations providing limited access space.

2. Background of the Invention

The present invention provides a climb assist system which may be readily mounted to an existing fall prevention system, such as may be found on a vertical, generally planar climbing structure, such as a ladder or similar vertical structure. Initially, the distinction between a fall arrest system and a climb assist system should be noted. A fall arrest system generally includes a rope or cable extending along a climbing structure for receiving a rope grab attached to a person, where the rope grab will immovably engage the rope or cable if a downward force is applied to an actuator of the rope grab, such as may occur when a person begins to fall from the climbing structure. In contrast, a climb assist system generally provides an upward force, such as from a counterweight attached via a rope or cable to a person to assist the person in ascending or descending the climbing structure. The counterweight provided by the climb assist system may facilitate slowing a person's descent, should the person fall from the climbing structure, but generally may not provide the safety of a fall arrest system to prevent or arrest the continued fall of a person from the climbing structure.

In recent years, a growing use of installations comprising elevated structures supporting equipment requiring maintenance, has resulted in an increased desirability to provide a climb assist system to facilitate access to the equipment. One such installation comprises wind tower installations in which wind driven turbines are mounted at the top of towers. Such wind tower installations are being designed to increasing heights in a continuing effort to place the wind turbine on the top of the tower at an optimal location for receiving wind energy. For example, wind towers are now often constructed to heights exceeding 200 feet, and the wind towers may typically be grouped together in wind turbine farms, some of which may include hundreds of wind turbines. Maintenance of the wind turbines themselves requires experienced workers that typically have an expertise in working on electrical equipment. Further, maintenance of multiple wind towers in a wind turbine farm may require a worker to climb several towers each day which, when combined with the increasing height of the towers, may contribute to worker fatigue.

One proposed climbing aid for assisting a climber's ascent within a wind tower is noted in WO 2004/071930 A2. A counterweight is disclosed attached to a climber via a system of pulleys for counterbalancing the climber's weight to thereby assist ascent of the climber.

One difficulty in designing a system for installation in a wind tower relates to the particular construction of wind towers in which a plurality of platforms are provided in the ascent from the ground to the top of the tower. A slot or hole is provided through each of the platforms for a ladder and for allowing a climber to pass upwardly or downwardly through the platforms; however, the platforms pose a difficulty in that they may restrict passage of a counterweight or a modification of the platforms may be required to accommodate a counterweight.

It would be desirable to provide a climb assist system for a wind tower that may be installed without modification of the platform structures, and that may be implemented in a compact form so as to avoid intrusion into the operable space of a climber using the ladder.

SUMMARY OF THE INVENTION

The present invention provides a climb assist structure which may be readily mounted with an existing fall arrest structure to provide an assembly that is easily retrofit to existing climbing structures. Further, the climb assist structure may be substantially entirely attached to an ladder defining a climbing structure and employs a compact counterweight and guide structure for efficient implementation of the climb assist structure.

In accordance with one aspect of the invention, a climb assist system is provided for use in combination with a climbing structure having upper and lower ends. The climb assist system comprises a header assembly for attachment to the upper end of the climbing structure, the header assembly including a pulley frame having opposing front and rear ends and front and rear pulleys located adjacent the front and rear ends. At least one elongated guide member extends from the header assembly downwardly toward the lower end of the climbing structure. A climb assist cable extends over the front and rear pulleys and includes a front cable portion for extending along a front side of the climbing structure, and a rear cable portion for extending along a rear portion of the climbing structure adjacent to the at least one guide member. A counterweight is attached to the rear cable portion of the climb assist cable, the counterweight including a guide portion engaged with the at least one guide member.

In accordance with another aspect of the invention, a climb assist system is provided for attachment to a fall prevention system including a fall prevention cable attached to an upper cable support located at the upper end of a climbing structure. The climb assist system comprises a header assembly for attachment to the upper end of the climbing structure, the header assembly including a pulley frame having opposing front and rear ends and front and rear pulleys located adjacent the front and rear ends. A vertical brace includes a first end for attachment to the upper cable support and a second end engaged with the pulley frame between the front and rear pulleys. First and second guide cables extend from the pulley frame downwardly toward the lower end of the climbing structure. A climb assist cable extends over the front and rear pulleys and includes a front cable portion for extending along a front side of the climbing structure, and a rear cable portion for extending along a rear portion of the climbing structure adjacent to the first and second guide cables. A counterweight is attached to the rear cable portion of the climb assist cable, the counterweight including at least one guide portion engaged with at least one of the guide cables.

In accordance with a further aspect of the invention, a climb assist system is provided in combination with a ladder comprising vertically extending side rails and vertically spaced horizontal rungs extending between the side rails, including a fall prevention system comprising a fall prevention cable having upper and lower ends attached to upper and lower cable supports, respectively, at upper and lower rungs of the ladder. The climb assist system comprises a header assembly including a vertical brace and a horizontally extending pulley frame having opposing front and rear ends, the vertical brace having a first end engaged with the upper cable support and a second end engaged with the pulley frame between the front and rear ends. The pulley frame comprises lateral vertical walls and lateral horizontal wings extending from the lateral vertical walls. The pulley frame also includes front and rear pulleys located adjacent the front and rear ends, respectively, of the pulley frame and between the lateral vertical walls. First and second guide cables are provided, each guide cable including an upper end attached to a respective one of the lateral wings and a lower end rigidly fixed adjacent a lower end of the ladder. The guide cables extend along a rear side of a plane defined by the rungs of the ladder. A climb assist cable extends over the front and rear pulleys and includes a front cable portion extending along a front side of the plane defined by the rungs of the ladder adjacent to the fall prevention cable, and a rear cable portion extending along the rear side of the plane defined by the rungs of the ladder and located between the first and second guide cables. A counterweight is attached to the rear cable portion of the climb assist cable for substantially offsetting the weight of a person attached to the front cable portion, the counterweight including first and second guide portions engaged over the first and second guide cables, respectively.

DETAILED DESCRIPTION OF THE INVENTION

Figure 1:
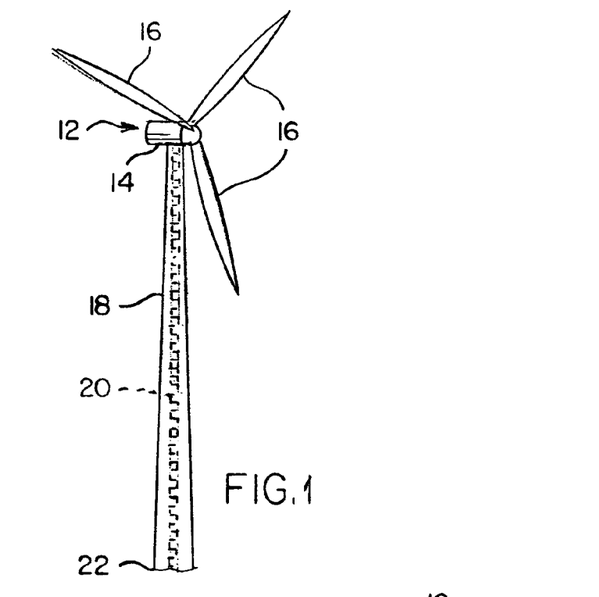
FIG. 1 depicts a wind tower into which the climb assist system described herein may be incorporated.
Figure 2:
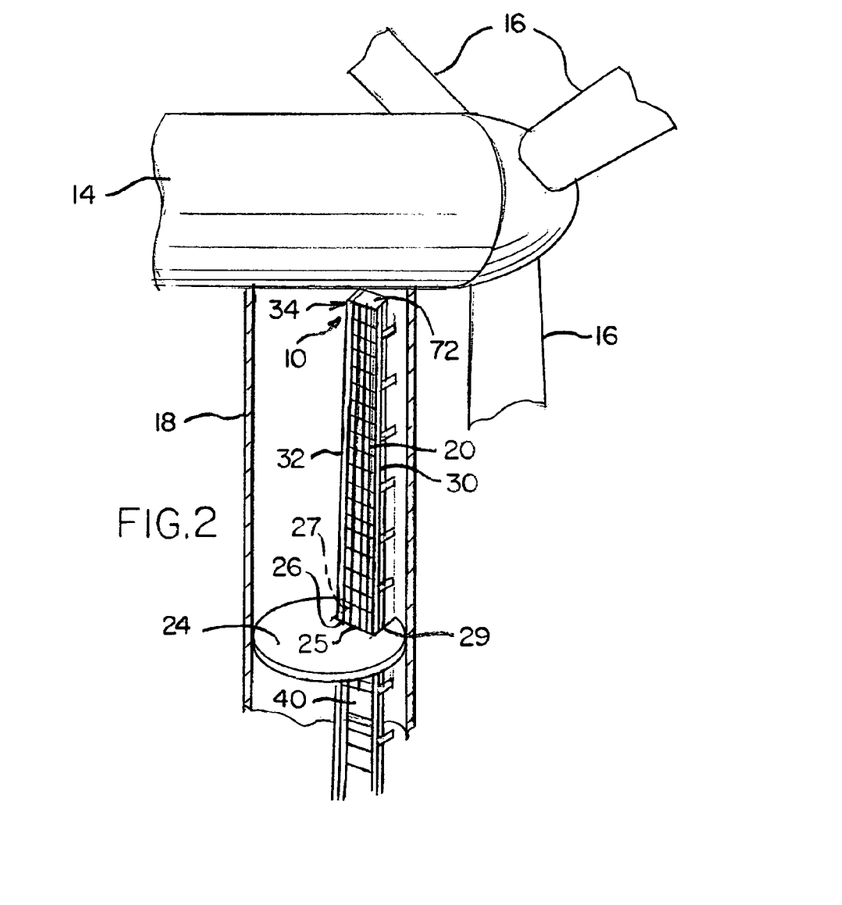
FIG. 2 is a partially cut away view of the top portion of a wind tower, including a ladder and incorporating the climb assist system described herein.

Referring to FIGS. 1 and 2, the climb assist system 10 described herein is shown in combination with a wind tower 12 having a turbine 14 driven by wind impinging on blades 16. The turbine 14 is supported on top of a vertically extending tower structure 18. The tower structure 18 is constructed as a hollow structure and includes a vertically extending climbing structure, illustrated herein as a ladder 20 attached to an interior surface of the tower structure 18. The ladder 20 extends from a lower location adjacent a base 22 of the tower structure 18 to an upper location adjacent the turbine 14. In addition, a plurality of platforms 24 (only one shown) are located within the tower structure 18 positioned in vertically spaced relation to each other. The ladder 20 extends through holes 26 formed in the platforms 24 where a backside of the ladder 20, facing away from the attachment location to the interior surface of the tower structure 18, is located closely adjacent to a laterally extending edge 25 of the hole 26 and side rails 30, 32 of the ladder 20 are located closely adjacent to side edges 27, 29 of the hole 26. In a typical wind tower 12, the hole 26 for passage of a worker climbing the ladder 20 is relatively small and may comprise an opening on the order of two feet-by-two feet. The worker climbs the ladder 20 in a space provided between the interior surface of the tower structure 18 and the ladder 20.

Referring to FIGS. 3-7, the climb assist system 10 described herein generally comprises a header assembly 34, a pair of guide members 36, 38 connected to the header assembly 34, a weight 40 and a climb assist cable 42 extending through the header assembly 34 and connected to the weight 40. The header assembly 34 comprises a pulley frame 44 including first and second generally L-shaped plates 46, 48, where each plate 46, 48 comprises a lateral vertical wall 50 and a lateral horizontal wing 52. The plates 46, 48 are fastened together by fasteners, such as bolts 54, and are held in spaced relation to each other by spacers 56. A pair of pulleys are located in the space between the plates 46, 48 and comprise a front pulley 58 and a rear pulley 60. The pulleys 58, 60 are located on opposing sides of a vertical brace 62 comprising a pair of elongate vertically extending bars 64, 66. Upper ends of the vertically extending bars 64, 66 are attached to outer surfaces of the lateral vertical walls 50 of the plates 46, 48 and are held in spaced relation to each other at a lower end 68 of the vertical brace 62 by a spacer 70 held in place by a fastener 71.

The upper portion of the header assembly 34 is strengthened by a plate 72 that extends across the upper surfaces of the lateral horizontal wings 52 and functions to increase the rigidity of the plates 46, 48 to resist torsional and bending forces applied to the climb assist system 10. A pair of eye bolts 74, 76 extend through the lateral horizontal wings 52 and the plate 72 for supporting and aligning the guide members 36, 38 adjacent the rear side of the ladder 20, where the guide members 36, 38 extend between the rear side of the ladder 20 and the laterally extending edge 25 of the hole 26. The guide members 36, 38 may comprise either a flexible or a rigid structure, and preferably comprise a steel cable or similar material that is relatively inextensible and that is resistant to abrasion.

The header assembly 34 is adapted to be mounted to a fall arrest system 78 which may already be present on the ladder 20. The fall arrest system 78 comprises an upper square tubing support 80 that is anchored to a pair of upper rungs 82, 84 of the ladder 20 with clamp brackets 86, 88. An anchor head 90 may be bolted to the square tubing support 80 for supporting a fall arrest line 92 to be engaged by a worker's rope grab safety mechanism The lower end 68 of the vertical brace 62 is dimensioned to fit inside the square tubing support 80, and includes apertures 94, 96 aligned with an upper mounting bolt location for the anchor head 90. A bolt 98 may be removed to permit insertion of the vertical brace 62, and the bolt 98 may be reinserted to complete mounting of the climb assist system 10 to the fall arrest system 78.

The climb assist cable 42 extends over the front and rear pulleys 58, 60 and includes a front cable portion 100 and a rear cable portion 102 (FIG. 5) where the front cable portion 100 is located extending along a front side of a plane 103 defined by the rungs of the ladder 20 and the rear cable portion 102 is located on a rear side of the plane 103 defined by the rungs of the ladder 20. Also, it should be noted that the rear cable portion 102 may lie close to or substantially within a plane defined by the guide members 36, 38. As may be best seen in FIGS. 3 and 4, a lower edge of the lateral vertical walls 50 may rest against an upper surface of the anchor head 90 to provide additional support to the head assembly 34 against downwardly directed forces that may be applied by a worker's weight to the front pulley 58 through the front cable portion 100.

Figure 3:
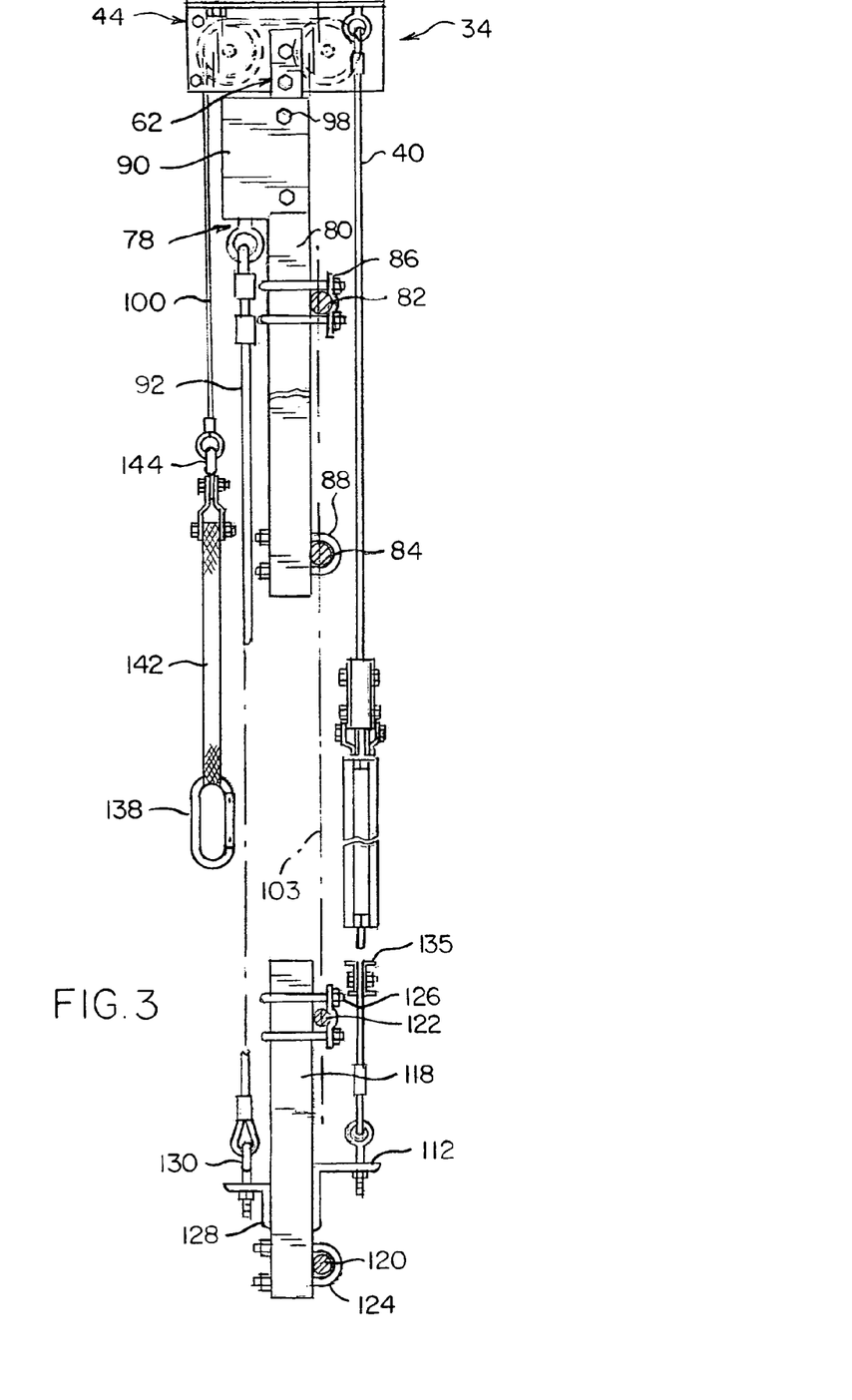
FIG. 3 is a side elevation view of the climb assist system described herein and shown in combination with a ladder and fall arrest system.
Figure 4:
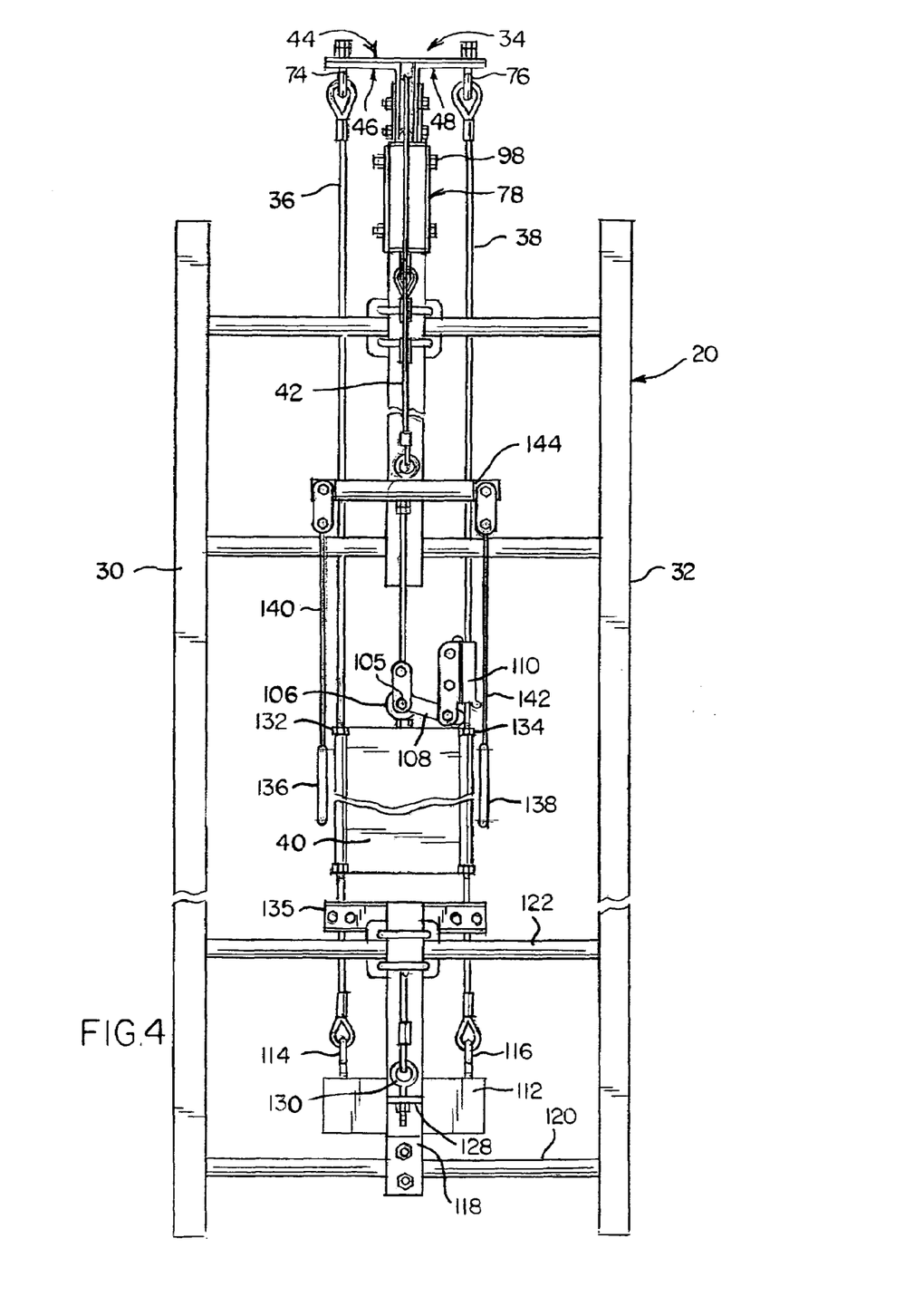
FIG. 4 is a front elevation view of the climb assist system described herein and shown in combination with the ladder and fall arrest system.
Figure 5:
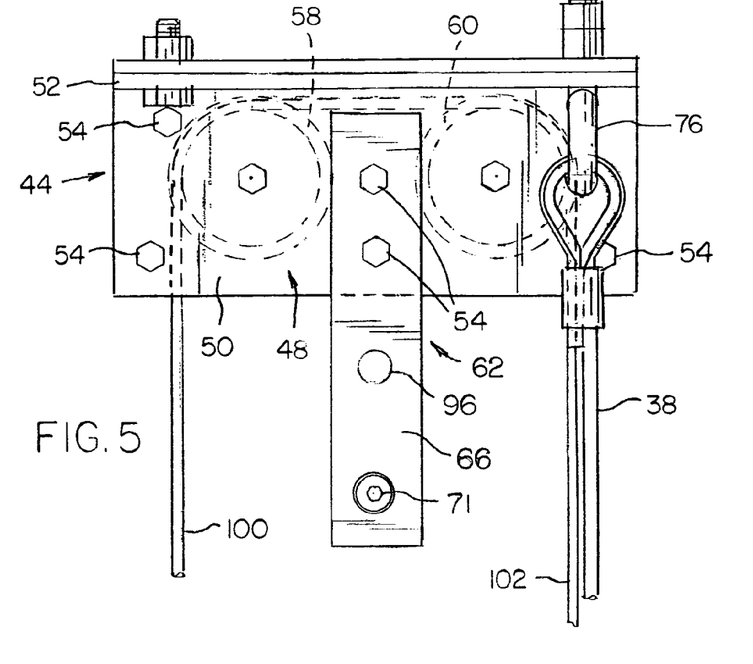
FIG. 5 is a side elevation view of a header assembly for the climb assist system described herein.
Figure 6:
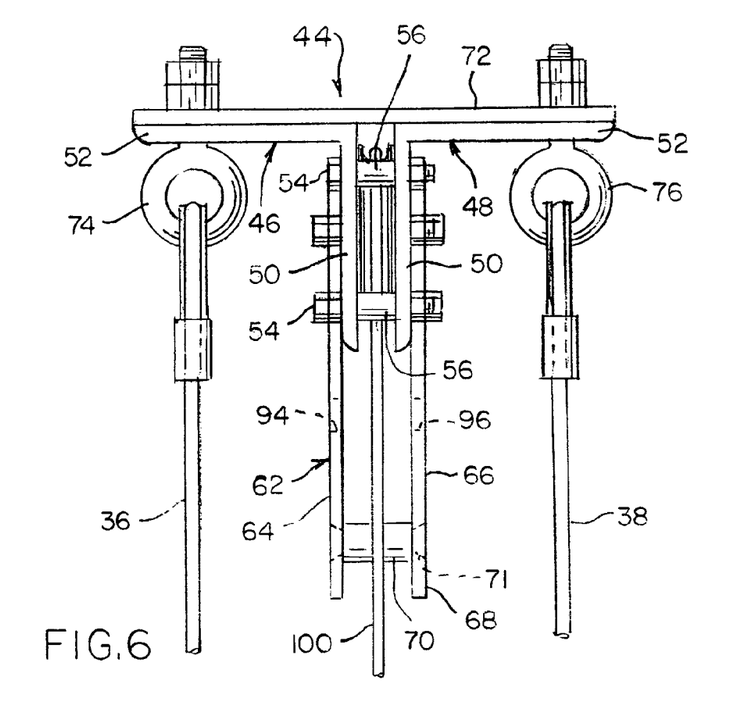
FIG. 6 is a front elevation view of the header assembly for the climb assist system described herein.
Figure 7:
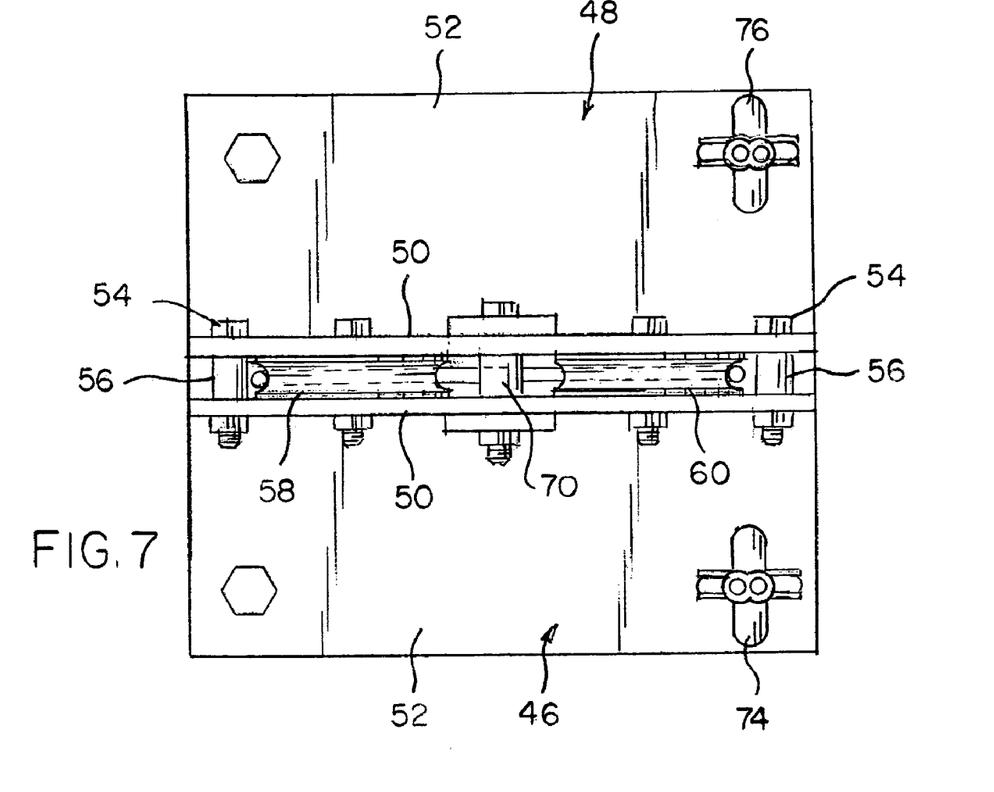
FIG. 7 is a bottom plan view of the header assembly for the climb assist system described herein.

The rear cable portion 102 is connected to an upper end of an actuator link 104, and a lower end of the actuator link 104 is connected to an eye bolt 106 fastened to an upper edge of the weight 40. The lower end of the actuator link 104 is also connected to an actuator lever 108 for a cable grab safety mechanism 110 that is positioned over the guide member 38.

The actuator lever 108 is spring biased downwardly, or counterclockwise as seen in FIG. 4, toward a locking engagement position. The safety mechanism 110 may be of conventional design and may be, for example, similar to the mechanism disclosed in U.S. Pat. No. 5,855,251, which patent is incorporated herein by reference. A fastener 105 passing through the actuator link 104 and the eye bolt 106 has a diameter substantially smaller than the size of the opening through the eye bolt 106 receiving the fastener 105, such that the fastener 105 may move vertically within the opening through the eye bolt 106. When an upward force is applied to the rear cable portion 102, such as by the weight of a worker attached to the front cable portion 100, the end of the actuator lever 108 adjacent the fastener 105 is displaced upwardly to release the safety mechanism 110 for movement along the guide member 38. If tension on the rear cable portion 102 is relieved, the actuator lever 108 moves downwardly to lock the safety mechanism 110 in position on the guide member 38 to prevent the weight 40 from falling.

It should be noted that the lower ends of the guide members 36, 38 are attached to a lower L-shaped anchor plate 112 by a pair of eye bolts 114, 116. The lower anchor plate 112 is mounted to a lower square tubing support 118 that is mounted to a lower pair of rungs 120, 122 of the ladder 20 with clamp brackets 124, 126. The lower square tubing support 118 may be provided as part of the fall arrest system 78 and includes a lower fall arrest anchor plate 128 supporting an eye bolt 130 for connection to a lower end of the fall arrest line 92.

The weight 40 is provided with guides 132, 134 along opposing edges of the weight 40. The guide members 36, 38 extend through the guides 132, 134 to maintain the weight 40 at a predetermined position and alignment relative to the ladder 20. The space between the backside of the ladder 20 and the lateral edge 25 of the platform hole 26 is limited and may be on the order of 4.5 inches, requiring the weight 40 to be configured to clear the existing space provided at the backside of the ladder 20 where it passes through the platform 24. For example, without limitation, the weight 40 may have a front-to-rear dimension of approximately 1.5 inches, a side-to-side dimension of approximately 7 inches and a top-to-bottom dimension of approximately 24 inches to form an essentially elongated weight in the vertical direction positioned between within the width dimension of the side rails 30, 32 and located within the narrow gap between the backside of the ladder 20 and the lateral edge 25 of the hole 26.

A stop member 135 is attached to the guide members 36, 38 adjacent a lower end thereof to provide a stop for the weight 40. The stop member 135 is positioned to limit the downward movement of the weight and prevent engagement of the weight 40 with the connections between the guide members 36, 38 and the eye bolts 114, 116.

The climb assist system 10 may be entirely mounted directly to the ladder 20 provided for a wind tower 12, and may typically be installed without modification to the platforms 24 of the wind tower 12. Further, the climb assist system 10 may be mounted to existing fall prevention hardware, facilitating retrofit installation of the climb assist system 10.

In use, a worker may be attached to D-rings 136, 138 connected to the front cable portion 100 by straps 140, 142 and a yoke member 144. In addition, the worker may be connected to the fall arrest line 92 by means of a rope or cable grab safety mechanism (not shown) such as is disclosed in U.S. Pat. No. 5,855,251. As the worker applies weight to the climb assist cable 42, the actuator lever 108 is moved upwardly to release the climb assist safety mechanism 110, and the weight 40 acts to assist pulling upwardly on the worker to reduce the strain experienced by the worker while either ascending or descending the ladder 20. As the worker ascends the ladder 20, the weight 40 will move downwardly closely adjacent to the backside of the ladder 20, guided by the guide members 36, 38. Alternatively, as a worker descends the ladder 20, the weight 40 will move upwardly.

The weight 40 may be approximately 80 pounds for substantially offsetting the weight of a worker climbing the ladder 20. If additional weight should be required to counterbalance the worker's weight, additional weights, such as narrow weight bars may be attached to the weight 40. For example, weight may be added by bolting or otherwise attaching additional weights to the bottom of the weight 40 at a location between the guides 132 and 134.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A climb assist system for use in combination with a climbing structure having upper and lower ends, the climb assist system comprising:
    a header assembly for attachment to the upper end of the climbing structure, the header assembly including a pulley frame having opposing front and rear ends and front and rear pulleys located adjacent the front and rear ends;
    at least one elongated guide member extending from the header assembly downwardly toward the lower end of the climbing structure;
    a climb assist cable extending over the front and rear pulleys and including a front cable portion for extending along a front side of the climbing structure, and a rear cable portion for extending along a rear portion of the climbing structure adjacent to the at least one guide member;
    a counterweight attached to the rear cable portion of the climb assist cable, the counterweight including a guide portion engaged with the at least one guide member;
    including a fall prevention device for the counterweight, where the fall prevention device is engaged around the at least one quite member and includes an actuation lever connected to the climb assist cable; and
    wherein the counterweight includes an eye bolt member and the actuation lever includes a shaft engaged through a hole in the eye bolt member, where movement of the shaft within the hole actuates the fall prevention device into locking engagement with the at least one guide member.

2. The climb assist system of claim 1 wherein the pulley frame comprises a laterally extending member and the upper end of the at least one guide member is attached to the laterally extending member.

3. The climb assist system of claim 1 wherein the header assembly comprises a vertical brace attached to the pulley frame between the front and rear pulleys for supporting the pulley frame to the climbing structure.

4. The climb assist system of claim 1 including a second guide member wherein the climb assist cable is located between the guide members.

5. The climb assist system of claim 4 wherein the pulley frame comprises first and second generally L-shaped plates, each plate defining a lateral vertical wall and a lateral horizontal wing, where one of the guide members is attached to each of the lateral horizontal wings.

6. The climb assist system of claim 5 including an anchor plate for attachment to the lower end of the climbing structure, where a lower end of each of the guide members is attached to the anchor plate.

7. The climb assist system of claim 5 wherein the front and rear pulleys rotate in a plane generally parallel to the lateral vertical plates, and a plane defined by the guide members is oriented generally perpendicular to the lateral vertical plates.

8. The climb assist system of claim 7 wherein the counterweight comprises substantially flat front and rear sides defining a width dimension that is generally at least as great as the spacing between the guide members, where a plane parallel to the front and rear sides of the counterweight is generally perpendicular to the lateral vertical plates.

9. A climb assist system for attachment to a fall prevention system including a fall prevention cable attached to an upper cable support located at the upper end of a climbing structure, the climb assist system comprising:
  a header assembly for attachment to the upper end of the climbing structure, the header assembly including a pulley frame having opposing front and rear ends and front and rear pulleys located adjacent the front and rear ends;
  a vertical brace including a first end for attachment to the upper cable support and a second end engaged with the pulley frame between the front and rear pulleys;
  first and second guide cables extending from the pulley frame downwardly toward the lower end of the climbing structure;
  a climb assist cable extending over the front and rear pulleys and including a front cable portion for extending along a front side of the climbing structure, and a rear cable portion for extending along a rear portion of the climbing structure adjacent to the first and second guide cables;
  a counterweight attached to the rear cable portion of the climb assist cable, the counterweight including at least one guide portion engaged with at least one of the guide cables;
  including a fall prevention device for the counterweight, where the fall prevention device is engaged around one of the guide cables and includes an actuation lever connected to the climb assist cable; and
  wherein the counterweight includes an eve bolt member and the actuation lever includes a shaft engaged through a hole in the eve bolt member, where movement of the shaft within the hole actuates the fall prevention device into locking engagement with the one of the guide cables.

10. The climb assist system of claim 9 wherein the pulley frame comprises first and second generally L-shaped plates, each plate defining a lateral vertical wall and a lateral horizontal wing, where each of the guide cables is attached to one of the lateral horizontal wings.

11. The climb assist system of claim 10 wherein the front and rear pulleys rotate in a plane generally parallel to the lateral vertical plates, and a plane defined by the guide cables is oriented generally perpendicular to the lateral vertical plates.

12. A climb assist system in combination with a ladder comprising vertically extending side rails and vertically spaced horizontal rungs extending between the side rails, including a fall prevention system comprising a fall prevention cable having upper and lower ends attached to upper and lower cable supports, respectively, at upper and lower rungs of the ladder, the climb assist system comprising:
  a header assembly including a vertical brace and a horizontally extending pulley frame having opposing front and rear ends, the vertical brace having a first end engaged with the upper cable support and a second end engaged with the pulley frame between the front and rear ends;
  the pulley frame comprising lateral vertical walls and lateral horizontal wings extending from the lateral vertical walls;
  the pulley frame including front and rear pulleys located adjacent the front and rear ends, respectively, of the pulley frame and between the lateral vertical walls;
  first and second guide cables, each guide cable including an upper end attached to a respective one of the lateral wings and a lower end rigidly fixed adjacent a lower end of the ladder, the guide cables extending along a rear side of a plane defined by the rungs of the ladder;
  a climb assist cable extending over the front and rear pulleys and including a front cable portion extending along a front side of the plane defined by the rungs of the ladder adjacent to the fall prevention cable, and a rear cable portion extending along the rear side of the plane defined by the rungs of the ladder and located between the first and second guide cables;
  a counterweight attached to the rear cable portion of the climb assist cable for substantially offsetting the weight of a person attached to the front cable portion, the counterweight including first and second guide portions engaged over the first and second guide cables, respectively;
  including a fall prevention device for the counterweight, where the fall prevention device is engaged around one of the guide cables and includes an actuation lever connected to the climb assist cable; and
  wherein the counterweight includes an eve bolt member and the actuation lever includes a shaft engaged through a hole in the eve bolt member, where movement of the shaft within the hole actuates the fall prevention device into locking engagement with the one of the guide cables.

13. The climb assist system of claim 12 wherein each lateral vertical wall and one of the lateral horizontal wings are defined by a generally L-shaped plate extending between the front and rear sides of the plane defined by the rungs of the ladder.

14. The climb assist system of claim 12 including an anchor plate attached to the lower cable support, the lower ends of the first and second guide cables attached to the anchor plate.

15. The climb assist system of claim 14 wherein the lower cable support is attached directly to a rung of the ladder.

16. The climb assist system of claim 12 wherein the first and second guide portions extend through opposing side edges of the counterweight.

* * * * *

UNITED STATES PATENT AND TRADEMARK OFFICE
CERTIFICATE OF CORRECTION

PATENT NO.       : 7,600,610 B2
APPLICATION NO.  : 11/216779
DATED            : October 13, 2009
INVENTOR(S)      : Joseph F. Deuer It is certified that error appears in the above-identified patent and that said Letters Patent is hereby corrected as shown below:

Col. 7, line 43, "includes an eve bolt member" should read --includes an eye bolt member--;

Col. 7, line 45, "hole in the eve bolt member" should read --hole in the eye bolt member--;

Col. 8, line 40, "includes an eve bolt member" should read --includes an eye bolt member--;

Col. 8, line 42, "a hole in the eve bolt member," should read --a hole in the eye bolt member,--.

Signed and Sealed this

Twentieth Day of April, 2010

David J. Kappos
*Director of the United States Patent and Trademark Office*